United States Patent [19]

Durkin

[11] Patent Number: 4,865,674
[45] Date of Patent: Sep. 12, 1989

[54] METHOD OF CONNECTING TWO THERMOPLASTIC PIPES USING A BARBED METAL WELDING SLEEVE

[75] Inventor: Robert J. Durkin, Elkhart, Ind.

[73] Assignee: Elkhart Products Corporation, Elkhart, Ind.

[21] Appl. No.: 254,047

[22] Filed: Oct. 6, 1988

[51] Int. Cl.⁴ .................. B32B 31/00; H05B 3/40
[52] U.S. Cl. ............... 156/158; 156/272.2; 156/273.9; 156/294; 156/309.6; 219/535; 219/544; 264/27; 264/273; 285/423
[58] Field of Search .............. 156/272.2, 273.7, 273.9, 156/274.2, 275.1, 294, 298, 304.2, 309.6, 309.9, 359, 158; 219/8.5, 10.53, 535, 544; 285/21, 423; 264/27, 273, 274

[56] References Cited

U.S. PATENT DOCUMENTS

| | | | |
|---|---|---|---|
| 2,423,922 | 7/1947 | Arndt | 156/273.9 X |
| 2,739,829 | 3/1956 | Pedlow et al. | 156/309.6 X |
| 2,930,634 | 3/1960 | Merritt | 219/535 X |
| 3,061,503 | 10/1962 | Gould et al. | 156/274.2 |
| 3,094,452 | 6/1963 | Von Riegen et al. | |
| 3,378,672 | 4/1968 | Blumehkranz | |
| 3,453,006 | 7/1969 | Levake | 285/423 X |
| 3,506,519 | 4/1970 | Blumenkranz | |
| 3,941,641 | 3/1976 | Heller et al. | 156/272.2 X |
| 3,954,541 | 5/1976 | Landgraf | 156/309.3 X |
| 4,176,274 | 11/1979 | Lippera | 219/544 X |
| 4,266,997 | 5/1981 | Lippers | |
| 4,508,368 | 4/1985 | Blumenkranz | |
| 4,622,087 | 11/1986 | Amsell | |
| 4,626,308 | 12/1986 | Ansell | 285/21 X |
| 4,630,846 | 12/1986 | Nishino et al. | 156/304.2 X |

FOREIGN PATENT DOCUMENTS 0133015  7/1984  Japan ................ 156/273.9

Primary Examiner—Michael W. Ball
Assistant Examiner—David William Herb
Attorney, Agent, or Firm—Tilton, Fallon, Lungmus & Chestnut

[57] ABSTRACT

A method of connecting two thermoplastic pipes and joint resulting therefrom which includes an electrically conductive insert sleeve with radially extending barbs alternately projecting to the inside and outside diameter of the sleeve into the adjacent fused plastic to achieve the joint.

6 Claims, 1 Drawing Sheet

METHOD OF CONNECTING TWO THERMOPLASTIC PIPES USING A BARBED METAL WELDING SLEEVE

BACKGROUND AND SUMMARY OF INVENTION

This invention relates to a method of connecting two thermoplastic pipes and the joint achieved thereby and, more particularly, to a connection achieved through the use of a novel metal sleeve interposed between the two pipes.

Although it is well known to employ electrically heatable sleeves for joining thermoplastic pipes—see U.S. Pat. No. 3,061,503—I have discovered a superior way of doing this which includes the use of a sleeve with radial barbs. These barbs are alternately projected to the inside and outside of the metal sleeve. The telescoping of the two pipes force the barbs into alignment with the generally cylindrical envelope of the sleeve. Upon heating, the barbs relax to their original shape to become embedded in the fused pipe joint.

Other objects and advantages of the invention may be seen in the details of the ensuing specification.

The invention is described in conjunction with an illustrative embodiment in the accompanying drawing, in which FIG. 1 is an exploded, perspective, fragmentary view of pipes about to be joined through the practice of the invention;

DETAILED DESCRIPTION

Figure 1:
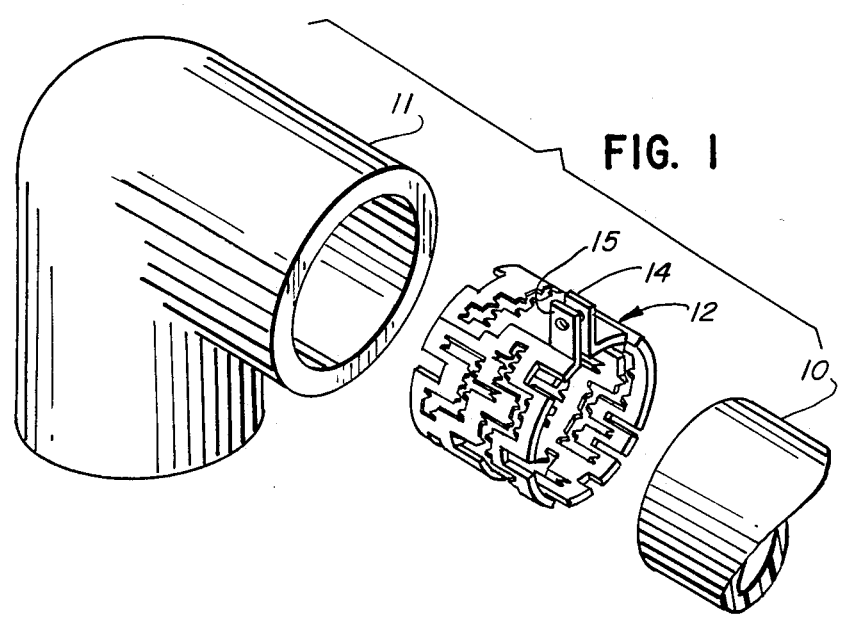

In the illustration given and with reference first to FIG. 1, the numeral 10 designates the end of a thermoplastic pipe which is intended to be united with a fitting or second pipe 11—as by telescoping or ensleeving the two together. This is achieved by the inventive metal sleeve generally designated 12 and seen in the central portion of FIG. 1.

Advantageously, the sleeve 12 is made from a strip of thin (0.012-0.015") SAE No. 1074 spring steel.

Figure 2:
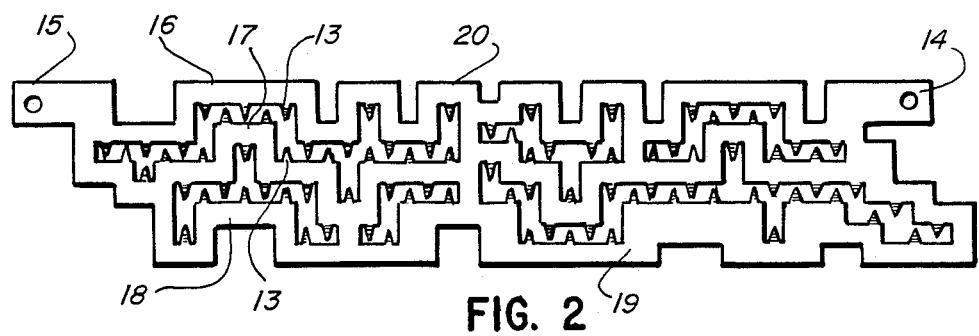
FIG. 2 is a top plan view of the inventive metal sleeve employed in the practice of the invention.
Figure 3:
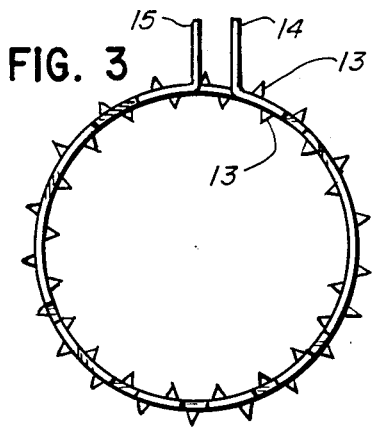
FIG. 3 is an end elevational view of the inventive metal sleeve and wherein the same has been shaped to a generally cylindrical form.
Figure 4:
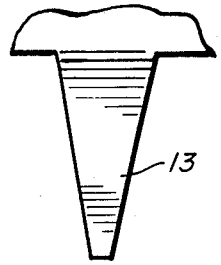
FIG. 4 is a fragmentary top plan view of one of the barbs of the inventive metal sleeve.

Initially, a strip of spring steel is stamped to the configuration seen in FIG. 2 and thereafter cylindrically rolled to its final diameter as seen in FIG. 3. An important feature of the metal sleeve 12 are the barbs 13—compare FIGS. 3 and 6.

The spring steel is especially advantageous in developing the barbs 13. The barbs 13 which are formed integrally within the stamping are bent at projections which are compressed when a pipe or fitting contacts them. When the electric current applied through the terminals 14 and 15 melts the plastic, the barbs act like an uncoiled leaf spring, moving the melted plastic as they relax from compression. The movement of these barbs causes the molten plastic of the pipe and fitting to mix.

The sleeve 13 is formed like a slit piece of tubing. Spring steel allows the slit to expand and contract to fit the pipe diameter. This eliminates a diameter tolerance of the sleeve from adding to the stack up of overall assembly tolerance and thus, dimensional reliability is improved.

Since electric current is employed to heat the sleeve, parallel circuit paths as at 16, 17 and 18 (see FIG. 2) are employed to insure that the heat is evenly dispersed throughout the sleeve. This achieves the objective to melt the plastic adjacent the barbs evenly so that sealing occurs throughout the sleeve length. Each circuit path is approximately equal in length, yielding approximately equal resistance.

Figure 5:
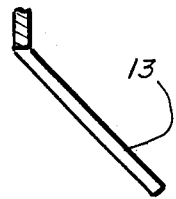
FIG. 5 is a side elevational view of the barb of FIG. 4.

The barbs, as best seen in FIG. 2, are formed within the parallel circuit paths. These barbs are then alternately bent plus and minus 45° from the stamping thickness—see FIG. 5, for example.

The stamping 12 is then cylindrically rolled to its finished diameter. A staggered or serpentine seam along each edge as at 19 and 20 is provided so that no electrical contact is made completely along the circumference of the sleeve. Also, the terminals extend from each side of the seam 20 such that an impressed voltage causes parallel current flow through the stamping. As the stamping is rolled into a cylinder, the barbed projections 13 are now positioned to extend toward the inside and outside diameters. These barbs will then be compressed toward the stamping thickness as the pipe is inserted on the inside diameter and a fitting or second pipe is ensleeved or mounted on the outside diameter.

The terminals 14, 15 protrude at the ensleeved end of the second pipe or fitting 11 and voltage is connected to these terminals. Normally, the resistance of the sleeve is low and a control system (not shown) is employed to limit current flow in the time during which current is applied. A variation of the current level in time is selected for different polyolefin and pipe sizes. This can be achieved through a conventional switch selectable for ease of application and utilizing suitable alternating current.

As current flows through the parallel paths of the sleeve insert, heat is generated. This heat melts the plastic from the pipes 10, 11 and as the plastic melts, the previously compressed barbs begin to move to their relaxed position. This movement displaces plastic along the barb's path and the displaced plastic moves into the openings in the stamping, joining with the plastic displaced by the other barbs. The plastic mixes and seals, encasing the steel insert.

Especially advantageous is the clamping or immobilizing action of the barbs during initial assembly so as to prevent pipe separation or movement once the assembly is achieved. It will be appreciated that although the barbs project radially relative to the sleeve, their length extends axially of the pipes. This facilitates assembly yet retains the immobilization function. For example, the pipe 10 is initially moved in the direction of the arrow 21 seen in the lower right hand portion of FIG. 6 relative to the sleeve 12. On the other hand, the pipe or fitting 11 is moved in the direction of the arrow 22 relative to the sleeve 12—see the upper left hand portion of FIG. 6. This facilitates assembly and it will be appreciated that the angularity and shape of the barbs 13 may be varied depending upon the specifications of the particular installation.

In addition to stabilizing the initial assembly, the sleeve cooperates with the fused pipes 10, 11 after the joint has been developed to provide a reinforced joint or connection.

EXAMPLE

As a specific example of the practice of the invention, a metal sleeve having an outside nominal diameter of 1.289" with tolerance of plus 0.033 and minus 0.033 was provided for a 1" IPS. The inside diameter measured between the radially inwardly projecting barbs or tangs 13 was 1.239" and the outer diameter or envelope about the tips of the radially outward extending barbs was 1.339". This has been used successfully with polyethylene, polypropylene and polybutylene pipes when electric current of 120 volts has been impressed across the terminals 14, 15.

A typical sequence of operation is as follows:

Pipe End Preparation

The pipe end is to be cut square with a tubing cutter. Burrs or uneven edges caused by handling or cutting are removed. The pipe end is clean so as to be free of dirt, grease, oil or other foreign substances. Isopropyl alcohol or soap and water is used advantageously for the cleaning. After cleaning, all soap residue is removed and the surfaces are completely dry.

Fitting Preparation

The same sequence of steps is employed to ensure cleanliness of the socket of the fitting or the end of the second pipe, as the case may be.

Sleeve to Pipe Installation

The sleeve is aligned so that the electrical terminals 14, 15 are in a position inwardly of the free end of the pipe intended to be joined. The sleeve is firmly slid onto the pipe until the sleeve end is flush with the pipe end. At such time, the barbs in contact with the pipe are sprung to outward, locking position so as to immobilize the sleeve relative to the pipe.

Install Sleeve/Pipe Assembly to Fitting

Figure 6:
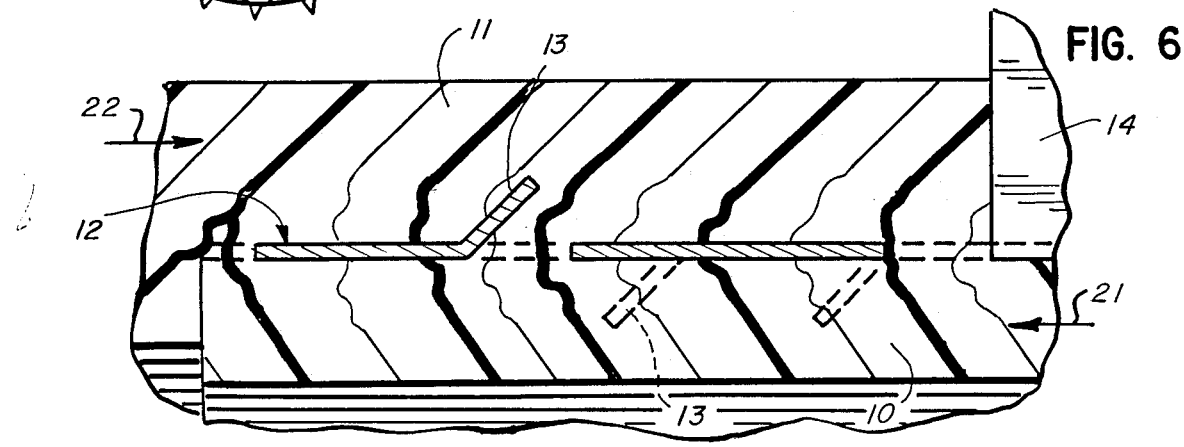
FIG. 6 is an enlarged sectional view of a completed joint according to the practice of the invention.

The ensleeved pipe end is inserted into the opening of the fitting cup or second pipe and the sleeved end is slid thereinto. This results in the terminals being positioned as seen in FIG. 6 and the barbs in contact with the fitting cup are sprung inwardly, locking the fitting in place.

Electric Current Application

The leads from a conventional welding control box are attached to the electric terminals. Watt-Seconds required to join the pipe and fitting are selected by reference to the manufacturer's instructions for the specific plastic being assembled. The fusion cycle is activated by pressing the start button and the welder leads are maintained in place until the fusion cycle is complete.

Cooling and Repositioning

The pipe or fitting should not be rotated or repositioned once the fusion cycle has finished. The assembly should not be moved until the plastic has cooled and hardened. The average cooling time is 20 seconds for sizes under 2", 30 seconds up to 3" and 10 seconds per additional inch of diameter for larger fittings.

Joint Inspection

Inspection is performed to ensure that the joint is intact and formed properly. The pipe should be squarely in the fitting and the plastic should show a slight beading surrounding the sleeve and fitting cup.

Testing

The fusion weld system is ready for short term pressure testing with cold water 15 minutes after the joint has cooled to room temperature. Allow the system to age for 24 hours and test at design pressure and temperature.

While in the foregoing specification a detailed description of an embodiment of the invention has been set down for the purpose of explanation, many variations in the details hereingiven may be made by those skilled in the art without departing from the spirit and scope of the invention.

I claim:

1. A method of connecting two thermoplastic pipes comprising ensleeving a first pipe with a metal welding sleeve having a plurality of integral barbs directed inwardly thereof into resilient engagement with said first pipe, said sleeve having a second plurality of integral barbs directed outwardly thereof, ensleeving a second pipe over said first pipe with said second plurality of barbs being in resilient engagement with said second pipe, said ensleeving steps forcing the first mentioned plurality of barbs outwardly and said second plurality of barbs inwardly so as to lie generally parallel to said welding sleeve, applying electrical current to said sleeve to simultaneously fuse said plastic pipes adjacent said sleeve and resiliently project both said barb pluralities to their original positions and into their respective pipes because of the elastic memory of said barbs, and cooling the pipe sleeve assembly with said barbs embedded in both pipes.

2. The method of claim 1 in which said sleeve has integral connector means adjacent parametric side thereof projecting generally radially away from said first pipe and adjacent to but outside of the ensleeved end of said second pipe.

3. The method of claim 1 in which said sleeve is initially stamped from a unitary strip to provide a plurality of parallel electrical paths.

4. The method of claim 1 in which said barbs are elongated in a direction axially of said pipes.

5. The method of claim 4 in which said barbs are disposed at about a 45° angle relative to the generally cylindrical envelope of said welding sleeve.

6. The method of claim 1 in which said pipes are constructed of polyolefin material.

* * * * *